United States Patent [19]
Kim

[11] Patent Number: 6,005,554
[45] Date of Patent: Dec. 21, 1999

[54] REMOTE CONTROLLER HAVING SPHERICAL SENSOR FOR DETECTING TRACKBALL MOVEMENT

[75] Inventor: Jeung-Soo Kim, Kyungki-Do, Rep. of Korea

[73] Assignee: LG Electronics Inc., Seoul, Rep. of Korea

[21] Appl. No.: 08/881,204

[22] Filed: Jun. 24, 1997

[30] Foreign Application Priority Data

Jun. 24, 1996 [KR] Rep. of Korea ........................ 96-23309

[51] Int. Cl.⁶ .................................................... G09G 5/08
[52] U.S. Cl. .............................................. 345/167; 341/176
[58] Field of Search ..................................... 345/157, 158, 345/162, 163, 164, 165, 166, 156, 161, 167, 168, 169; 359/115; 341/176; 385/123; 250/227.11, 231.11; 348/12; 178/18.03

[56] References Cited

U.S. PATENT DOCUMENTS

| | | | |
|---|---|---|---|
| 5,457,478 | 10/1995 | Frank | 345/158 |
| 5,545,857 | 8/1996 | Lee et al. | 178/18.03 |
| 5,583,541 | 12/1996 | Solhjell | 345/163 |
| 5,648,781 | 7/1997 | Choi | 341/176 |
| 5,706,026 | 1/1998 | Kent et al. | 345/156 |

*Primary Examiner*—Richard A. Hjerpe
*Assistant Examiner*—Francis Nguyen

[57] ABSTRACT

A remote controller having a spherical sensor for detecting trackball movement including a spherical sensor for detecting trackball movement amount in accordance with a position detecting signal and outputting a movement amount detecting signal, a controller for receiving the movement amount detecting signal outputted from the spherical sensor and outputting a cursor movement signal, and an infrared ray transmitter for transmitting an infrared ray signal serving as a cursor movement signal outputted from a microcomputer.

8 Claims, 3 Drawing Sheets

REMOTE CONTROLLER HAVING SPHERICAL SENSOR FOR DETECTING TRACKBALL MOVEMENT

BACKGROUND OF THE INVENTION

1. Field of the Invention

The present invention relates to a technology for moving an on-screen cursor that is controllable by a remote controller for a display apparatus such as a television receiver or a computer monitor. More particularly, the invention is directed to an improved remote controller having a spherical sensor for detecting trackball movement, including the detection of trackball movement with regard to a spherical guide, for thereby facilitating on-screen cursor movement.

2. Description of the Prior Art

In general, a viewer-operated remote controller is employed to move an on-screen cursor, and specifically to direct an up/down key such as a channel key or a volume key.

However, such a conventional remote controller has a couple of disadvantages in that the cursor is slow in its movement and significant time is required for searching where a considerable amount of information is involved in the search.

In a recent effort to solve the disadvantages of the conventional remote controller, there has been proposed technology in which a movement of a remote controller is directly detected using a signal outputted from a signal amount detector provided at four corners of a monitor, and an on-screen cursor is moved in accordance with the amount of such movement. However, a complicated composition and frequent errors associated with use of such technology inevitably have yet to be solved.

SUMMARY OF THE INVENTION

Accordingly, it is an object of the present invention to provide a remote controller having a spherical sensor for detecting trackball movement which makes it possible to detect trackball movement in a spherical guide by providing a press-operated device or a light-operated device, for thereby facilitating on-screen cursor movement.

To achieve the above-described object, there is provided a remote controller having a spherical sensor for detecting trackball movement which includes a spherical sensor for detecting the amount of trackball movement amount in accordance with a position detecting signal and outputting a movement amount detecting signal, a controller for receiving the movement amount detecting signal outputted from the spherical sensor and outputting a cursor movement signal, and an infrared ray transmitter for transmitting an infrared ray signal serving as a cursor movement signal outputted from a microcomputer.

BRIEF DESCRIPTION OF THE DRAWINGS

The present invention will become more clearly understood with reference to the accompanying drawings given only by way of illustrations and thus which are not limited to the present invention, and wherein.

DETAILED DESCRIPTION OF THE INVENTION

Figure 1:
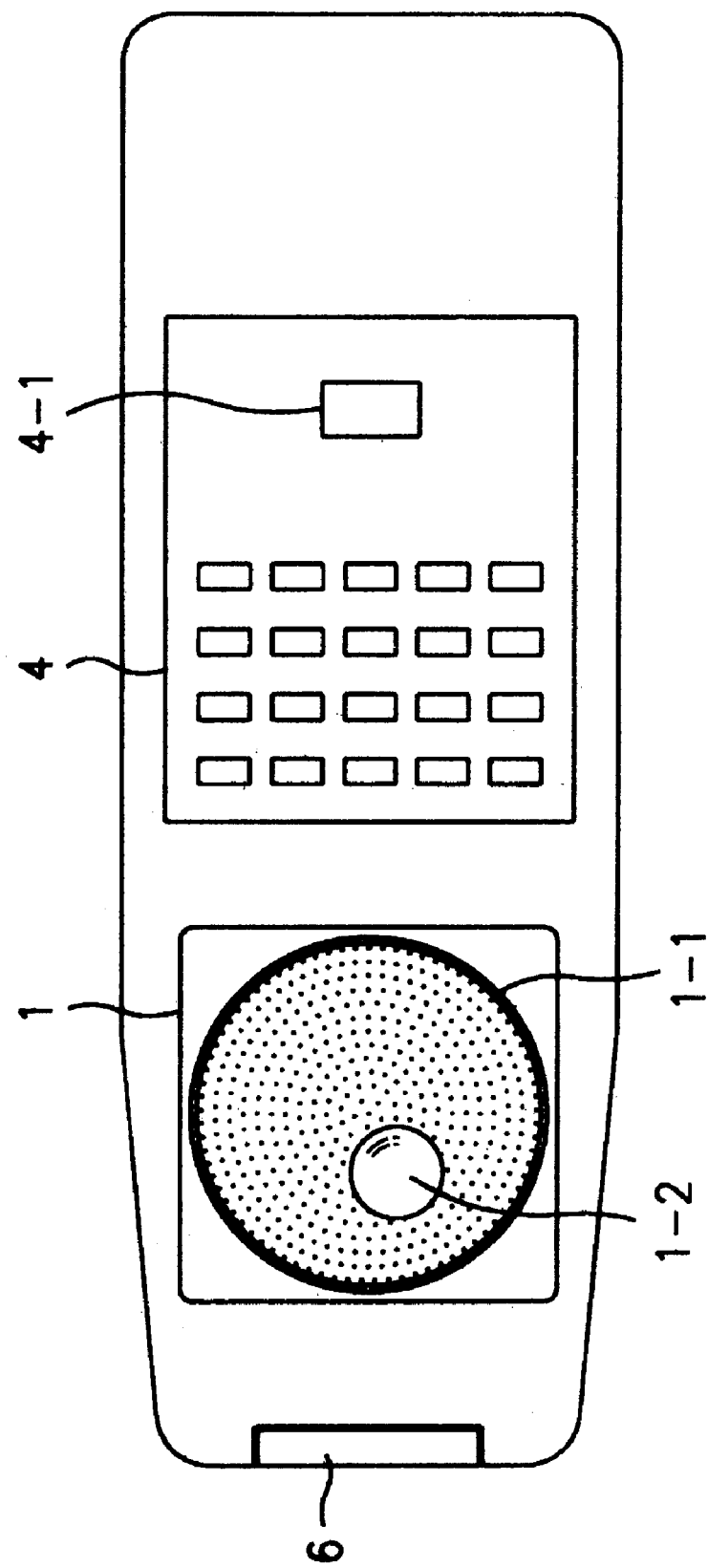
FIG. 1 is a schematic plan view of a remote controller having a spherical sensor for detecting trackball movement according to the present invention.
Figure 2:
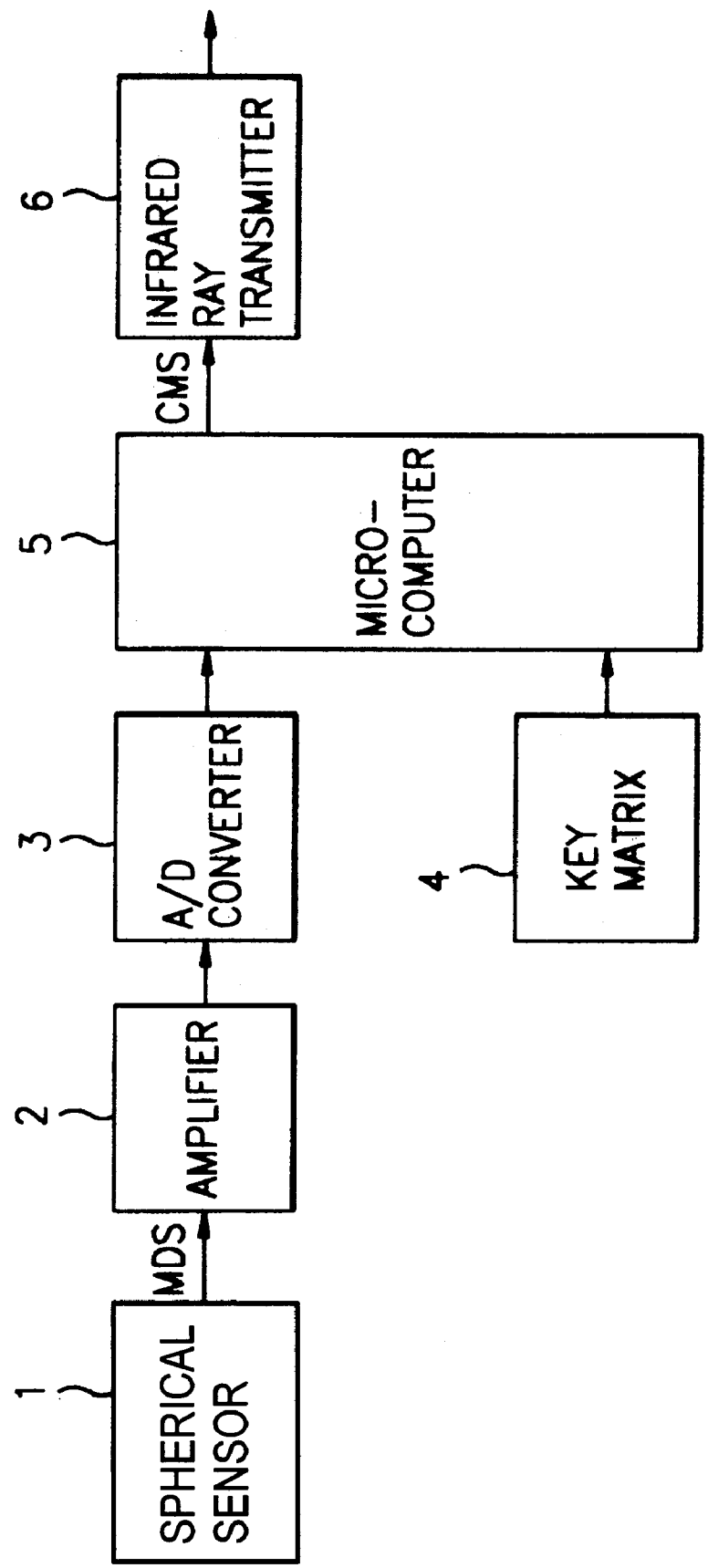
FIG. 2 is a block diagram of a remote controller having a spherical sensor for detecting trackball movement according to the present invention.

With reference to FIGS. 1 and 2, a viewer-operated remote controller having a spherical sensor for detecting trackball movement according to the present invention is herein often described. A spherical sensor 1 detects trackball movement in accordance with a position detecting signal and outputs a movement detecting signal MDS. An amplifier 2 amplifies the movement detecting signal MDS outputted from the spherical sensor 1 to a designated level. An analog/digital converter 3 converts the analog signal outputted from the amplifier 2 to a digital signal. A microcomputer 5, when a hook switch 4-1 is turned on, receives the digital signal outputted from the analog/digital converter 3 and outputs a cursor movement signal CMS, wherein the microcomputer 5 outputs a signal in accordance with an input signal of a key matrix 4 in a normal mode. An infrared ray transmitter 6 transmits an infrared ray signal serving as the cursor movement signal CMS outputted from the microcomputer 5.

The spherical sensor 1 is provided with a spherical guide 1-1, a trackball 1-2 moving along the spherical guide 1-1, and a detector for detecting movement position of the trackball 1-2.

Use of the thusly constituted remote controller having a spherical sensor for detecting trackball movement according to the present invention will now be described with reference to FIGS. 1 through 2.

First, when the trackball 1-2 travels within the spherical guide 1-1 of the spherical sensor 1, the movement detecting signal MDS notifying a movement distance of the trackball 1-2 is outputted from the spherical sensor 1 in accordance with the detector disposed adjacent to the trackball 1-2, amplified to a designated level in the amplifier 2, and converted to a digital signal through the analog/digital converter 3. The converted signal is applied to the microcomputer 5

Here, the microcomputer 5 receives, in a normal mode, an input signal of the key matrix 4 instead of receiving a digital signal outputted from the analog/digital converter 3, and when a hook switch 4-1 in the key matrix 4 is turned on, the digital signal is activated and turned to the cursor movement signal CMS appearing on horizontal or vertical coordinates. Wherein the operation according to the cursor movement signal CMS on the horizontal coordinates or according to the cursor movement signal CMS on the vertical coordinates are determined by an extent to which the movement amount of the trackball 1-2 is calculated with regard to a cursor movement amount in a certain proportion.

A cursor up/down movement depends on components with which the trackball 1-2 travels back and forth within the spherical guide 1-1, and a cursor left/right movement depends on components with which the trackball 1-2 travels left and right. The cursor movement signal CMS according to the thusly operated horizontal or vertical coordinates is outputted to the infrared ray transmitter 6.

Then, the infrared ray transmitter 6 leads an infrared ray signal corresponding to the cursor movement signal CMS appearing on the horizontal or vertical coordinates to a display apparatus, and a controller (not shown) of the display apparatus serves to move the cursor to a vertical direction or a horizontal direction depending on the applied infrared ray signal.

The method of detecting the movement amount of the trackball 1-2 within the spherical guide 1-1 of the spherical sensor 1 will now be described.

Figure 3:
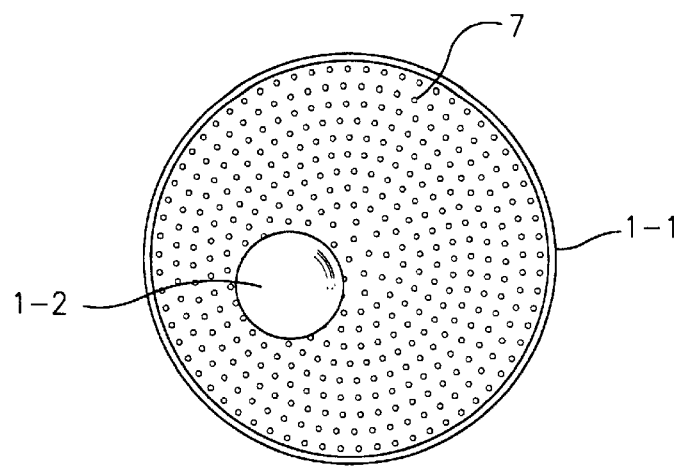
FIG. 3 is a schematic plan view of a spherical sensor employing a press-operated device of the remote controller of FIG. 1.

FIG. 3, illustrates one embodiment of the invention in which a plurality of press-operated devices 7 are employed for detecting the position of the trackball 1-2. The press-operated devices 7 are sequentially aligned on a lower spherical surface of the spherical guide 1-1. When the hook switch 4-1 is turned on, the press-operated devices 7 aligned adjacent to the trackball 1-2 are activated. Accordingly, the microcomputer 5 detects one or more of the plurality of press-operated devices which are used to output a turn-on signal for recognizing the initial location of the trackball 1-2. Then as the trackball 1-2 travels along the spherical guide 1-1 and stops at a location therealong, the press-operated devices 7 adjacent to the trackball 1-1 are again activated. Accordingly, the microcomputer 5 detects the press-operated devices 7 which outputs the turn-on signal and recognizes the initially moved location, and the initial location and the moved location thereof are appropriately calculated, for thereby obtaining a movement amount of the trackball 1-2.

Figure 4A:
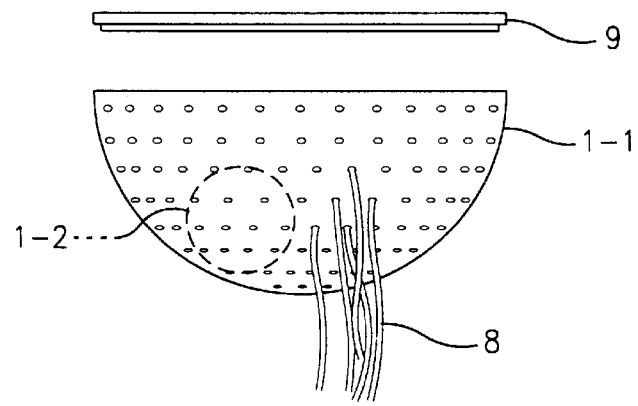
FIG. 4A is a plan view of a spherical sensor employing a light fiber bunch and a light-operated device of the remote controller of FIG. 1.
Figure 4B:
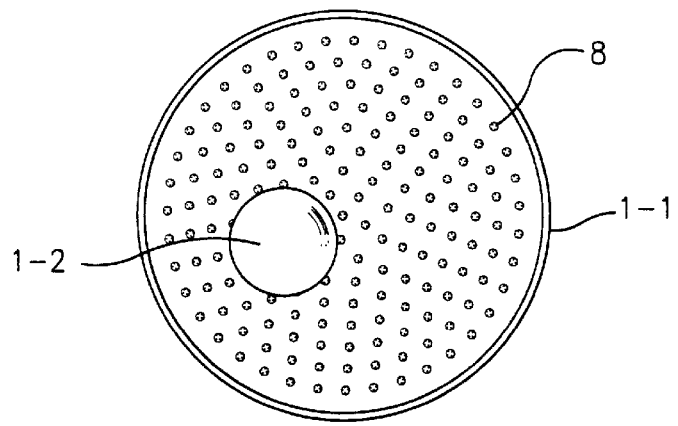
FIG. 4B is a side view of a spherical sensor employing a light fiber bunch and a light-operated device of the remote controller of FIG. 1

A second embodiment is shown in FIGS. 4A and 4B, which uses a light fiber bunch to detect the position of the trackball 1-1. In order to detect trackball movement using the light fiber bunch having a plurality of light-operated devices 8, the light fiber bunch 9 is aligned along a lower spherical surface of the spherical guide 1-1 and the light-operated devices 8 provided on an upper spherical surface serves to project light. At this time, some of the light fibers provided adjacent to the static trackball 1-2 do not receive light because the light is interrupted by the trackball 1-2, so that the potential of the light-operated device 8 disposed at an end of the light fibers which do not receive light are distinguished. Likewise, by detecting the location of the trackball 1-2, the detecting signal is outputted, and the process of recognizing movement of the trackball 1-2 in the microcomputer 5 becomes identical to the embodiment using the press-operated device.

Also, in a case in which the hook switch 4-1 is turned on, when a up/down/right/left key is inputted, a cursor movement signal can be outputted. That is, by controlling the cursor movement signal CMS being outputted to the infrared ray transmitter 6 and appearing on the horizontal or vertical coordinates, the cursor becomes significantly moved with regard to the movement amount or slightly moved.

As described above, the present invention is provided with a spherical guide including a trackball, a detector for detecting the moved location of the trackball, and the right/left/up/down signal movement signal is outputted in accordance with the detected movement amount, for thereby facilitating a cursor movement.

What is claimed is:

1. A remote controller, comprising:

a spherically shaped sensor having a ball supporting surface for detecting ball movement along the supporting surface and outputting a movement detecting signal representative of any detected movement;

an amplifier for amplifying the movement detecting signal produced by the spherical sensor;

a controller for receiving the amplified movement detecting signal outputted from the amplifier and outputting a cursor movement signal; and an infrared ray transmitter for transmitting an infrared ray signal serving as a cursor movement signal outputted from a microcomputer.

2. The controller of claim 1 wherein the spherically shaped sensor is comprised of a plurality of press-operated devices on a lower sperical surface of the spherical guide.

3. The controller of claim 1, wherein the spherically shaped sensor is comprised of a light fiber bunch aligned on the supporting surface of the spherically shaped sensor, and a plurality of light-operated devices disposed on the supporting surface of the spherically shaped sensor.

4. The controller of claim 1, wherein the controller comprises:

an analog/digital converter for converting an analog signal outputted from the amplifier to a digital signal; and a microcomputer for receiving a digital signal outputted from the analog/digital converter and outputting a cursor movement signal.

5. The controller of claim 4, wherein the microcomputer receives a digital signal outputted from the analog/digital converter and outputs a cursor movement signal when a hook switch is turned on, in which the microcomputer receives a signal outputted from a key matrix in a normal mode.

6. The controller of claim 1, wherein the ball moves along the ball supporting surface of the spherical guide in response to movement of the controller.

7. The controller of claim 1, wherein the ball moves along the ball supporting surface of the spherical guide in response to changes in the orientation of a center axis of the ball with respect to the remote controller.

8. A remote controller, comprising:

a sensing means for sensing the tilt of the remote controller;

an output means for outputting a signal for cursor movement responsive to sensing a tilt of the remote controller by the sensing means;

wherein said sensing means includes, a trackball that is movable in response to movement of the remote controller without direct contact by a user; and a spherically shaped sensor having a surface for supporting the trackball and for detecting trackball movement along the supporting surface and outputting a movement detecting signal representative of any detected movement.

\* \* \* \* \*